United States Patent
Kim et al.

(10) Patent No.: US 9,891,471 B2
(45) Date of Patent: Feb. 13, 2018

(54) BACKLIGHT UNIT HAVING A LENS WITH REFRACTION AND REFLECTION PORTIONS

(71) Applicant: LG ELECTRONICS INC., Seoul (KR)

(72) Inventors: Jaehyeok Kim, Seoul (KR); Eunseok Kim, Seoul (KR); Dohan Park, Seoul (KR); Dawoon Jung, Seoul (KR); Wondo Kee, Seoul (KR); Minho Kim, Seoul (KR); Jaehyung Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/174,437

(22) Filed: Jun. 6, 2016

(65) Prior Publication Data
US 2017/0123271 A1    May 4, 2017

(30) Foreign Application Priority Data

Nov. 2, 2015  (KR) .................. 10-2015-0153239

(51) Int. Cl.
*G02F 1/1333* (2006.01)
*G02F 1/1335* (2006.01)
*G02B 19/00* (2006.01)

(52) U.S. Cl.
CPC ... *G02F 1/133606* (2013.01); *G02B 19/0028* (2013.01); *G02B 19/0061* (2013.01); *G02F 1/133603* (2013.01); *G02F 1/133605* (2013.01); *G02F 2001/133607* (2013.01)

(58) Field of Classification Search
CPC ......... G02F 1/133603; G02F 1/133605; G02F 1/133606; G02F 2001/133607; G02B 19/0061; G02B 19/0066; G02B 19/0028; H01L 33/58; H01L 33/60
See application file for complete search history.

(56) References Cited

U.S. PATENT DOCUMENTS

| 3,881,628 A * | 5/1975 | Brainerd ............ A47L 15/4436 |
| | | 206/229 |
| 2008/0088953 A1 | 4/2008 | Kim et al. |
| 2010/0220461 A1 | 9/2010 | Naijo |
| 2011/0051411 A1 * | 3/2011 | Kim .................. G02F 1/133603 |
| | | 362/235 |
| 2015/0326767 A1 | 11/2015 | Kim |

FOREIGN PATENT DOCUMENTS

WO    WO 2014/077643 A1    5/2014

* cited by examiner

*Primary Examiner* — Suezu Ellis
(74) *Attorney, Agent, or Firm* — Birch, Stewart, Kolasch & Birch, LLP

(57) ABSTRACT

A display device is provided. The display device includes: a substrate; and at least one light assembly separately located on the substrate, wherein the light assembly includes: a light source; and a lens configured to shield an upper surface and a side surface of the light source, wherein the lens includes: a refraction portion separately located on the upper surface of the light source; and a reflection portion separately located at the side surface of the light source. Thereby, the lens includes a reflection portion located at a side surface of the light source, thereby improving light efficiency of a backlight unit.

19 Claims, 22 Drawing Sheets

(a)

(b)

(a)

(a)

(a)

(b)

(c)

(d)

(e)

(a)

(b)

(a)

(b)

BACKLIGHT UNIT HAVING A LENS WITH REFRACTION AND REFLECTION PORTIONS

CROSS REFERENCE TO RELATED APPLICATIONS

This application claims the benefit of Korean Patent Application No. 10-2015-0153239 filed on Nov. 2, 2015, the entire contents of which is hereby incorporated by reference in its entirety.

BACKGROUND OF THE DISCLOSURE

Field of the Disclosure

The present invention relates to a backlight unit and a display device including the same.

Background of the Disclosure

With the development of the information society, various demands for display devices have been increasing. In order to meet various demands for the display devices, various display devices, such as a liquid crystal display (LCD), a plasma display panel (PDP), an electroluminescent display (ELD), and a vacuum fluorescent display (VFD), have been recently studied and used.

A liquid crystal panel of the LCD includes a liquid crystal layer and an opposing thin film transistor (TFT) substrate and color filter substrate with the liquid crystal layer interposed therebetween and may display an image using light provided from a backlight unit.

SUMMARY OF THE DISCLOSURE

In accordance with an aspect of the present invention, a backlight unit includes: a substrate; and at least one light assembly separately located on the substrate, wherein the light assembly includes: a light source; and a lens configured to shield an upper surface and a side surface of the light source, wherein the lens includes: a refraction portion separately located on the upper surface of the light source; and a reflection portion separately located at the side surface of the light source.

The refraction portion and the reflection portion may be coupled by an adhesive layer.

The refraction portion and the reflection portion may be coupled by a double injection process.

The refraction portion may include a convex portion having hemisphere shape protruded upward; and a side portion extended from a lower portion of the convex portion and having cylindrical shape.

The reflection portion may have a diameter different from that of the side portion.

The reflection portion may have a diameter smaller than that of the side portion.

The reflection portion may include a central hole configured to penetrate a central portion; a pad located at an outer edge of the central hole; and an electrostatic portion located at the external diameter side of the reflection portion.

The pad may have a shape depressed into the reflection portion.

In the pad, a metal maybe inserted into a depressed portion, and the pad may be formed through an insert injection process of the metal.

The metal and the substrate may be coupled by a Surface Mount Technology (SMT) process.

The pad may be located at both sides of the central hole.

The pad may have a ring shape that encloses the central hole.

The electrostatic portion may have a shape depressed into the reflection portion, and a zener diode may be inserted into a depressed portion.

A low surface of the reflection portion may have any one shape of a triangle, a quadrangle, and a pentagon.

The reflection portion may have a protrusion therein.

The reflection portion may be inclined inward.

In accordance with another aspect of the present invention, a display device includes: a backlight unit; a display panel located at a front surface of the backlight unit; and a back cover located at a rear surface of the backlight unit, wherein the backlight unit includes: a substrate; and at least one light assembly separately located on the substrate, wherein the light assembly includes: a light source; and a lens configured to shield an upper surface and a side surface of the light source, wherein the lens includes: a refraction portion separately located on the upper surface of the light source; and a reflection portion separately located at the side surface of the light source.

The refraction portion and the reflection portion may be coupled by an adhesive layer.

The refraction portion and the reflection portion may be coupled by a double injection process.

The reflection portion may be inclined inward.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
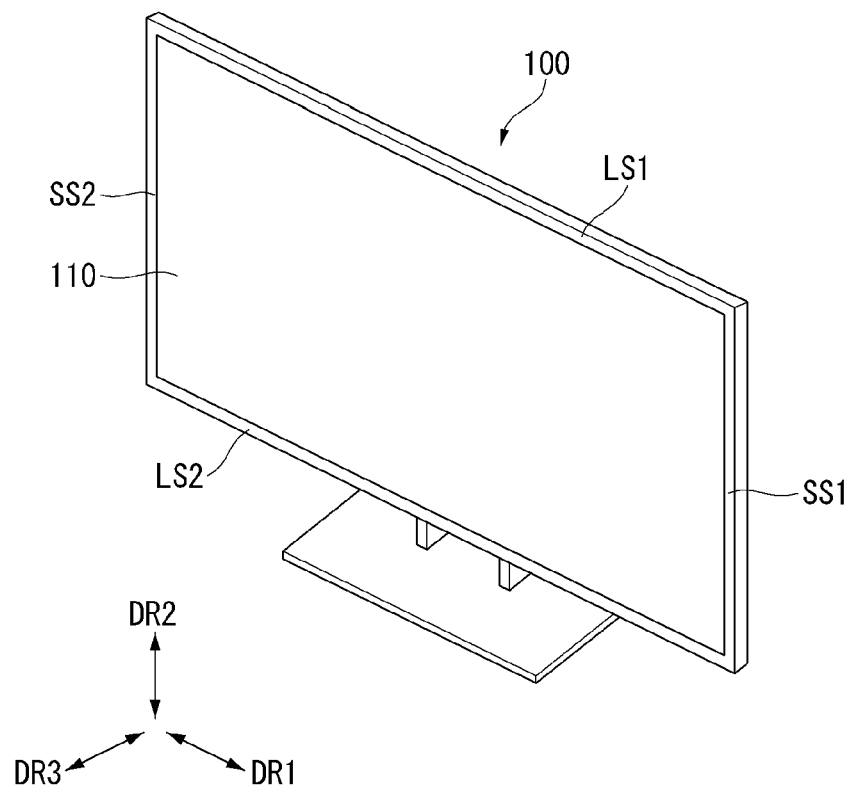
FIGS. 1 and 2 are perspective views illustrating a display device according to an exemplary embodiment of the present invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc., may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component (s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Hereinafter, as a display panel, a Liquid Crystal Display Device (LCD) is exemplified, but a display panel that can apply to a display device according to the present invention is not limited to the LCD and may be a Plasma Display Panel (PDP), a Field Emission Display (FED), and an Organic Light Emitting Display (OLED).

Figure 2:
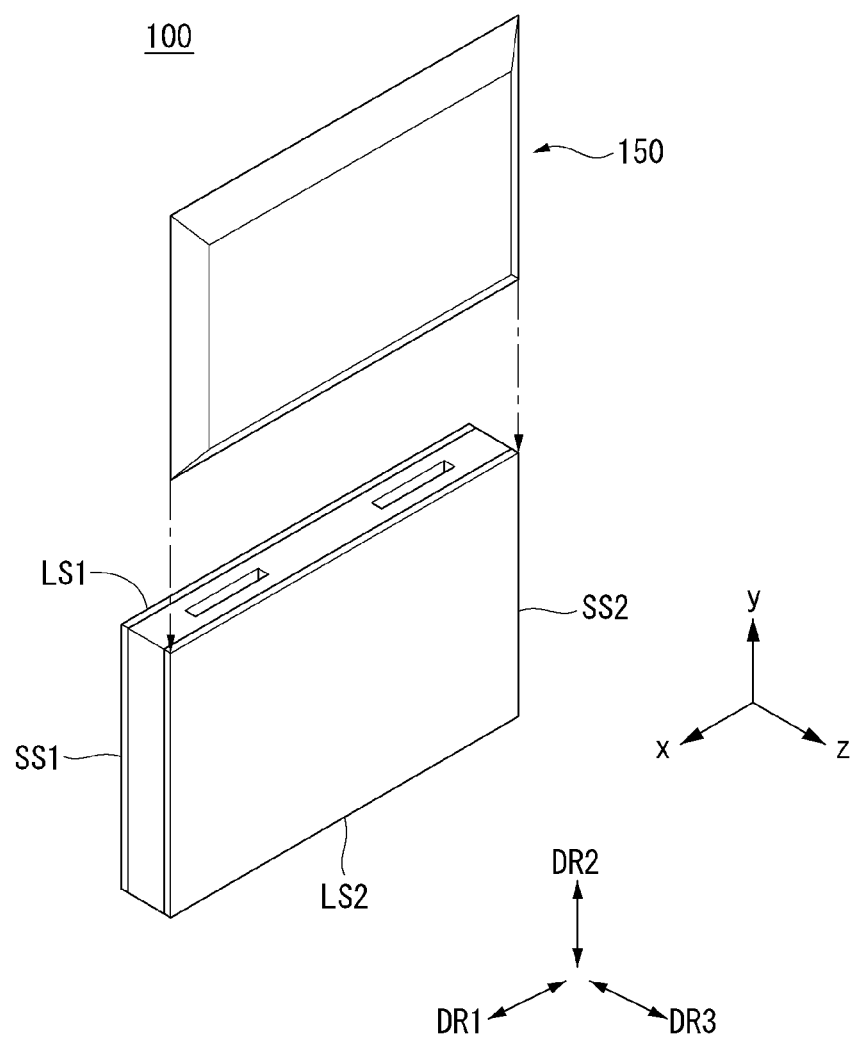

FIGS. 1 and 2 are perspective views illustrating a display device according to an exemplary embodiment of the present invention.

As shown in FIG. 1, a display panel 110 may include a First Long Side (LS1), a Second Long Side (LS2) opposite to the LS1, a First Short Side (SS1) adjacent to the LS1 and the LS2, and a Second Short Side (SS2) opposite to the SS1.

Here, an area of the SS1 may be referred to as a first side area, an area of the SS2 may be referred to as a second side area opposite to the first side area, an area of the LS1 may be referred to as a third side area adjacent to the first side area and the second side area and located between the first side area and the second side area, and an area of the LS2 may be referred to as a fourth side area adjacent to the first side area and the second side area, located between the first side area and the second side area, and opposite to the third side area.

Further, for convenience of description, it is described that a length of the LS1 and LS2 is longer than that of the SS1 and SS2, but a length of the LS1 and LS2 may be approximately the same as that of the SS1 and SS2.

Hereinafter, a First Direction (DR1) may be a direction parallel to the LS1 and LS2 of the display panel 100, and a Second Direction (DR2) may be a direction parallel to the SS1 and SS2 of the display panel 100.

A Third Direction (DR3) may be a direction vertical to the DR1 and/or the DR2.

The DR1 and the DR2 may be referred to as a horizontal direction.

Further, the DR3 may be referred to as a vertical direction.

As shown in FIG. 2, a display device 100 according to an exemplary embodiment of the present invention may include a display panel 110 and a back cover 150 of the rear side of the display panel 110.

The back cover 150 may be connected to the display panel 110 with a sliding method in a direction toward the LS2 from the LS1, i.e., in the DR2. In other words, the back cover 150 may be inserted with a sliding method from the SS1 of the display panel 110, the SS2 corresponding to the SS1, and the LS1 adjacent to the SS1 and the SS2 and located between the SS1 and the SS2.

In order to connect the back cover 150 to the display panel 110 with a sliding method, in the back cover 150 and/or other structures adjacent thereto, a protruding portion, a sliding portion, and a coupler may be included.

FIGS. 3 to 8 are views illustrating a configuration of a display device according to an exemplary embodiment of the present invention.

Figure 3:
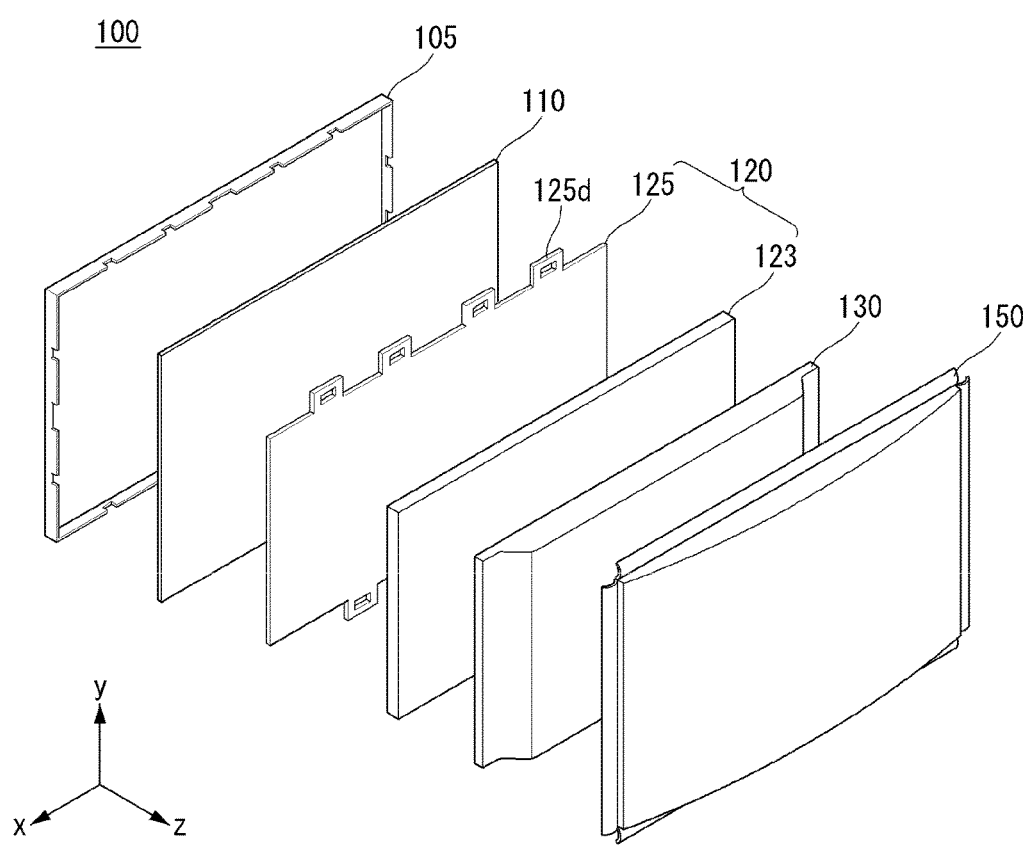
FIGS. 3 to 8 are views illustrating a configuration of a display device according to an exemplary embodiment of the present invention.

As shown in FIG. 3, the display device 100 according to an exemplary embodiment of the present invention may include a front cover 105, a display panel 110, a backlight unit 120, a frame 130, and a back cover 150.

The front cover 105 may cover at least a partial area of a front surface and a side surface of the display panel 110. The front cover 105 may have a quadrangular frame shape whose center is hollow. Because the center of the front cover 105 is hollow, an image of the display panel 110 may be displayed to the outside.

The front cover 105 may be divided into a front surface cover and a side surface cover. That is, the front cover 105 may be divided into a front surface cover located at the front surface side of the display panel 110 and a side surface cover located at the side surface side of the display panel 110. The front surface cover and the side surface cover may be separately formed. Any one of the front surface cover and the side surface cover may be omitted. For example, for an enhanced design, the front surface cover may not exist and only the side surface cover may exist.

The display panel 110 may be provided at a front surface of the display device 100 to display an image. The display panel 110 may divide an image into a plurality of pixels to output the image to correspond to a color, brightness, and chroma per pixel. The display panel 110 may be divided into an active area that displays an image and an inactive area that does not display an image. The display panel 110 may include an opposing front substrate and rear substrate with a liquid crystal layer interposed therebetween.

The front substrate may include a plurality of pixels formed with red R, green G, and blue B sub pixels. The front substrate may generate an image corresponding to a color of red, green, or blue according to a control signal.

The rear substrate may include switching elements. The rear substrate may switch a pixel electrode. For example, the pixel electrode may change molecule arrangement of the liquid crystal layer according to a control signal applied from the outside. The liquid crystal layer may include a plurality of liquid crystal molecules. The liquid crystal molecules may change arrangement to correspond to a voltage difference that has occurred between a pixel electrode and a common electrode. The liquid crystal layer may transfer light provided from the backlight unit 120 to the front substrate.

The backlight unit 120 may be located at the rear surface side of the display panel 110. The backlight unit 120 may include a plurality of light sources. A light source of the backlight unit 120 may be disposed in a direct type or an edge type. When the backlight unit 120 is an edge type backlight unit 120, the edge type backlight unit 120 may further include a light guide panel.

The backlight unit 120 may be coupled to the front side of the frame 130. For example, a plurality of light sources may be disposed at the front side of the frame 130, and this backlight unit may be referred to as an edge type backlight unit.

The backlight unit 120 maybe driven with an entire driving method or a partial driving method such as local dimming and impulsive. The backlight unit 120 may include an optical sheet 125 and an optical layer 123.

The optical sheet 125 may enable light of a light source to uniformly transfer to the display panel 110. The optical sheet 125 may be formed with a plurality of layers. For example, the optical sheet 125 may include at least one prism sheet and/or at least one diffusion sheet.

In the optical sheet 125, at least one coupler 125d may exist. The coupler 125d may be coupled to the front cover 105 and/or the back cover 150. That is, the coupler 125d may be directly coupled to the front cover 105 and/or the back cover 150. Alternatively, the coupler 125d may be coupled to a structure coupled on the front cover 105 and/or the back cover 150. That is, the coupler 125d may be indirectly coupled to the front cover 105 and/or the back cover 150.

The optical layer 123 may include a light source. A detailed configuration of the optical layer 123 will be described in a corresponding portion.

The frame 130 may perform a function of supporting constituent elements of the display device 100. For example, constituent elements of the backlight unit 120 may be coupled to the frame 130. The frame 130 may be made of a metal material such as an aluminum alloy.

The back cover 150 may be located at a rear surface of the display device 100. The back cover 150 may protect internal constituent elements from an external impact. At least a portion of the back cover 150 may be coupled to the frame 130 and/or the front cover 105. The back cover 150 may be an injection material made of a resin material.

Figure 4:
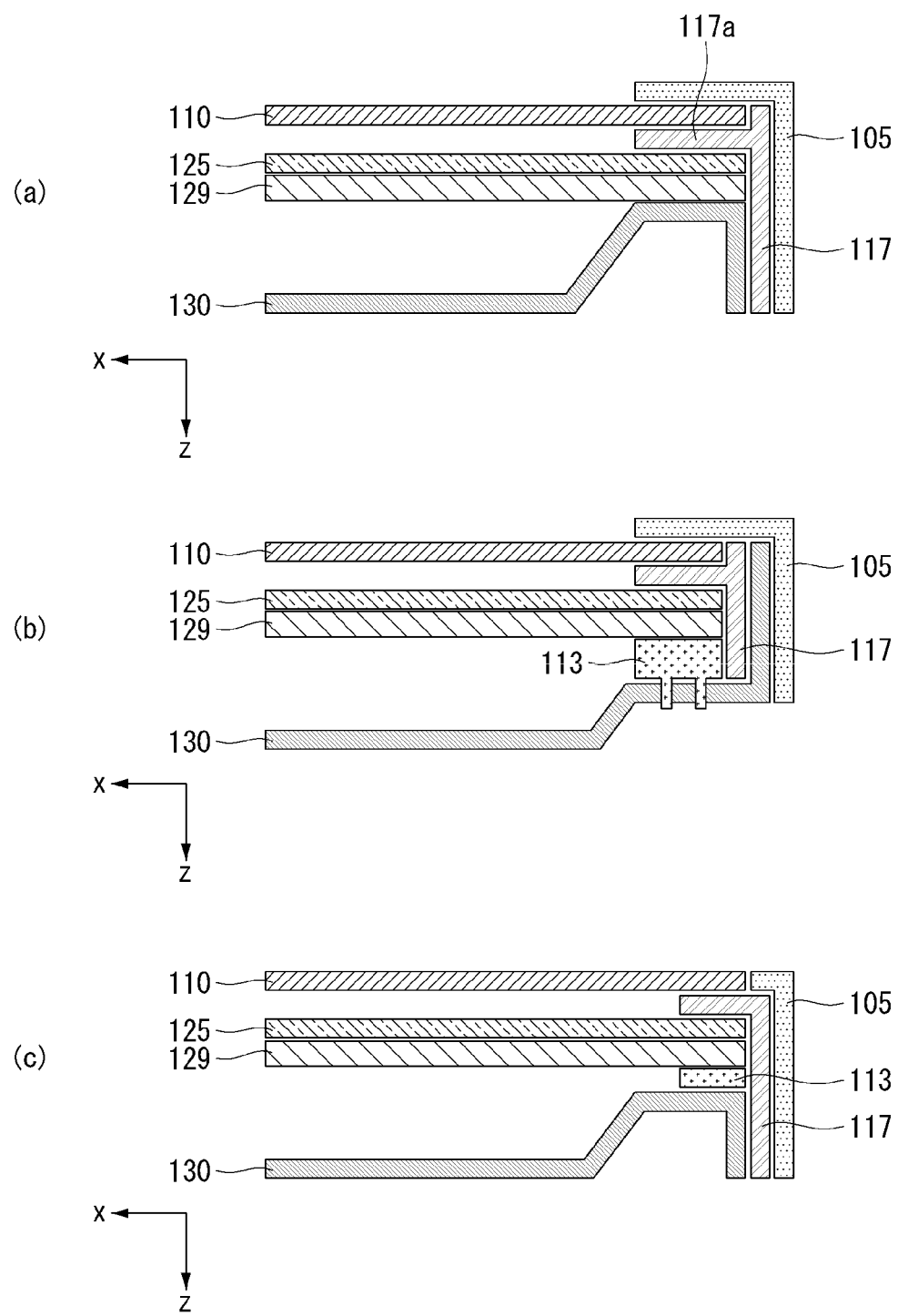

FIG. 4 is a cross-sectional view illustrating a configuration of the optical sheet 125.

As shown in FIG. 4A, in an upper portion of the frame 130, the optical sheet 125 and/or a diffusion plate 129 may be located. The optical sheet 125 and/or the diffusion plate 129 may be coupled to the frame 130 at an edge of the frame 130. The optical sheet 125 and/or the diffusion plate 129 may be directly received at the edge of the frame 130. That is, an outer circumference of the optical sheet 125 and/or the diffusion plate 129 may be supported by the frame 130. An upper surface of an edge of the optical sheet 125 and/or the diffusion plate 129 may be enclosed by a first guide panel 117. For example, the optical sheet 125 and/or the diffusion plate 129 maybe located between an edge of the frame 130 and a flange 117a of the first guide panel 117.

At the front surface side of the optical sheet 125, the display panel 110 may be located. An edge of the display panel 110 may be coupled to the first guide panel 117. That is, the display panel 110 may be supported by the first guide panel 117.

An edge area of the front surface of the display panel 110 may be enclosed by the front cover 105. For example, the display panel 110 may be located between the first guide panel 117 and the front cover 105.

As shown in FIG. 4B, the display device 100 according to an exemplary embodiment of the present invention may further include a second guide panel 113. The optical sheet 125 and/or the diffusion plate 129 may be coupled to the second guide panel 113. That is, the second guide panel 113 may be coupled to the frame 130, and the optical sheet 125 and/or the diffusion plate 129 may be coupled to the second guide panel 113. The second guide panel 113 may be made of a material different from that of the frame 130. The frame 130 may have a form that encloses the first and second guide panels 117 and 113.

As shown in FIG. 4C, in the display device 100 according to an exemplary embodiment of the present invention, the front cover 105 may not cover a front surface of the display panel 110. That is, one end portion of the front cover 105 may be located at a side surface of the display panel 110.

Figure 5:
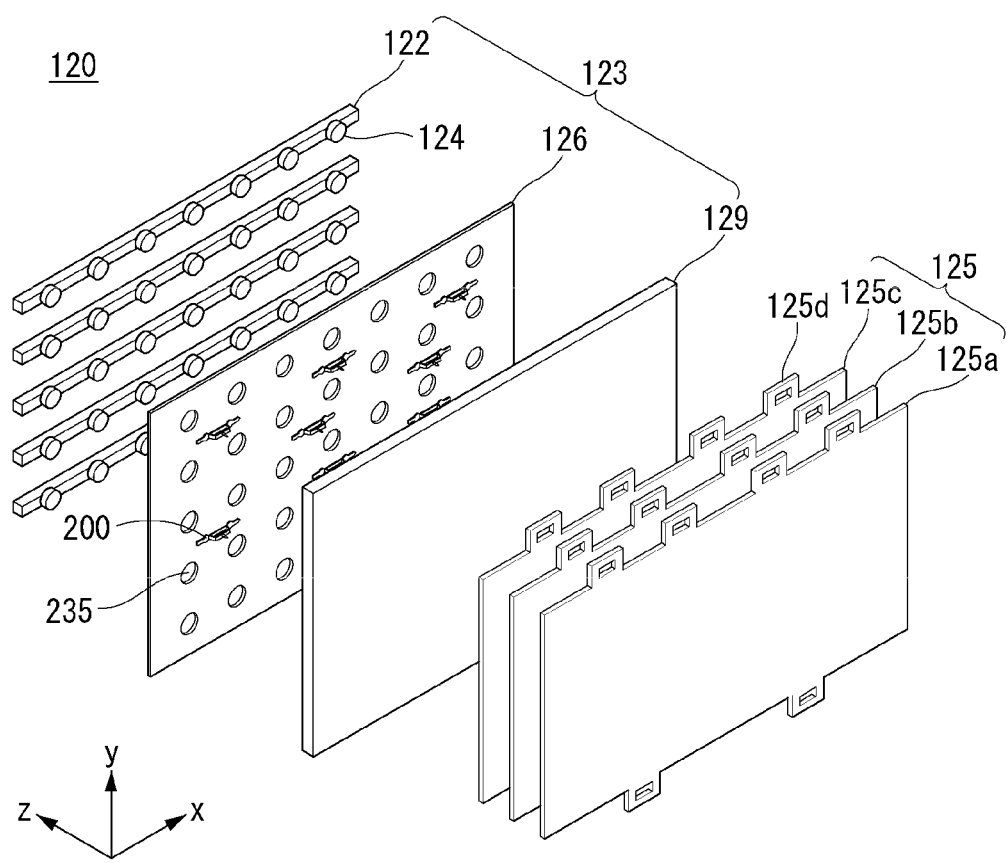
Figure 6:
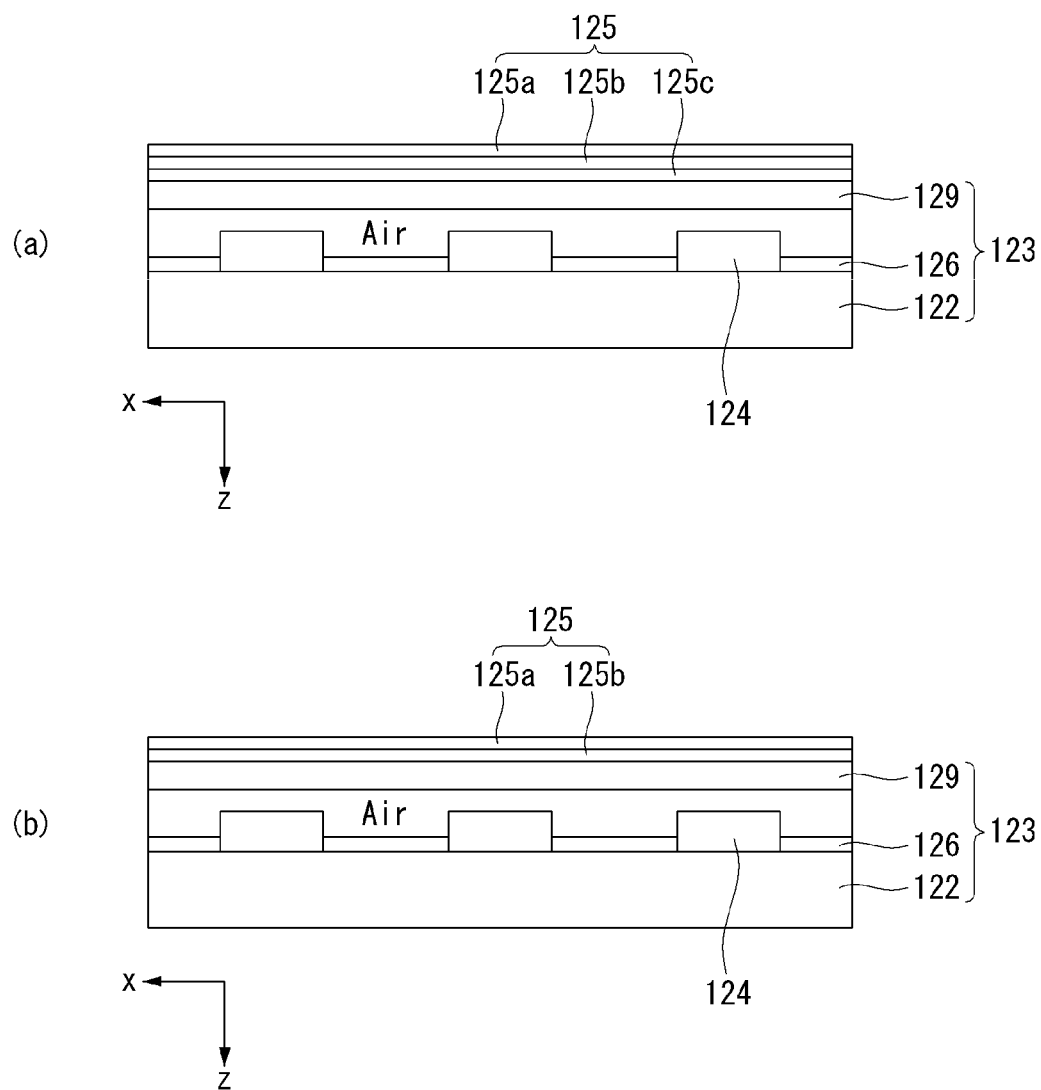
Figure 7:
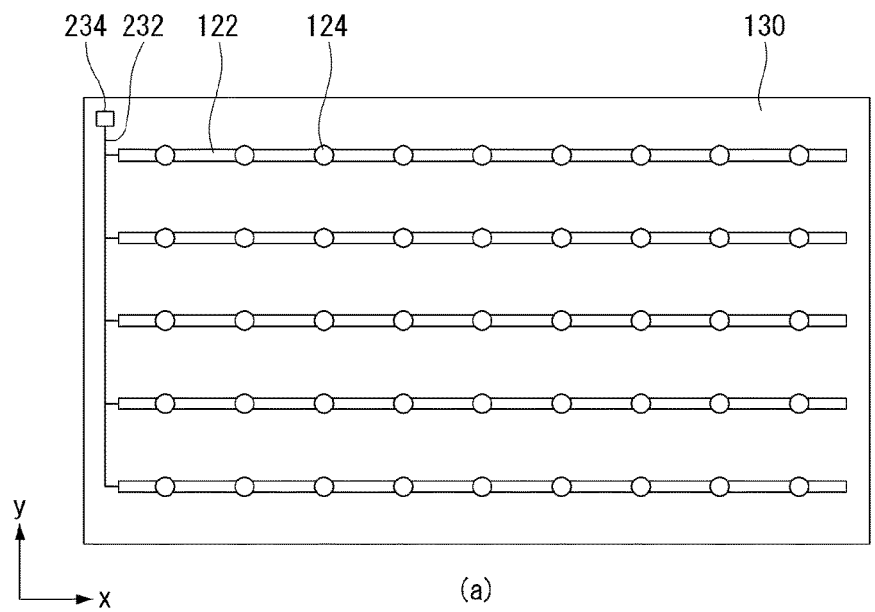
Figure 7:
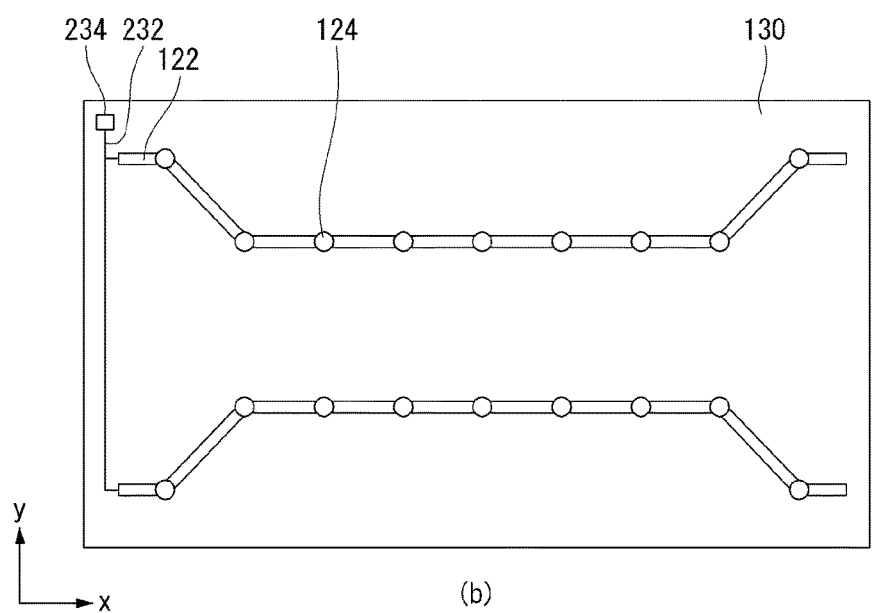

Referring to FIGS. 5 and 6, the backlight unit 120 may include a substrate 122, at least one light assembly 124, an optical layer 123 including a reflection sheet 126 and a diffusion plate 129, and an optical sheet 125 located at the front surface side of the optical layer 123.

The substrate 122 may be formed in a plurality of strap forms extended in a first direction and separated by a predetermined gap in a second direction orthogonal to the first direction.

In the substrate 122, at least one light assembly 124 may be mounted. In the substrate 122, an electrode pattern for connecting an adaptor and the light assembly 124 may be formed. For example, in the substrate 122, a carbon nanotube electrode pattern for connecting the light assembly 124 and the adaptor may be formed.

The substrate 122 may be made of at least one of polyethyleneterephthalate (PET), glass, polycarbonate (PC), and silicon. The substrate 122 may be a Printed Circuit Board (PCB) that mounts at least one light assembly 124.

In the substrate 122, the light assemblies 124 may be disposed at a predetermined gap in a first direction. A diameter of the light assembly 124 may be larger than a width of the substrate 122. That is, a diameter of the light assembly 124 may be larger than a second direction length of the substrate 122.

The light assembly 124 may be a light emitting diode package including a Light Emitting Diode (LED) chip or at least one light emitting diode chip.

The light assembly 124 may be formed with a color LED that emits at least one of colors such as red, blue, and green or a white LED. The color LED may include at least one of red LED, blue LED, and green LED.

A light source included in the light assembly 124 may be a Chip On Board (COB) type light source. The COB type light source may have a form that directly couples an LED chip, which is a light source to the substrate 122. Therefore, a process can be simplified. Further, resistance can be lowered and thus energy to be lost due to a heat can be reduced. That is, power efficiency of the light assembly 124 can be enhanced. The COB type light source can provide more bright lighting. The COB type light source maybe implemented in a smaller thickness and a lighter weight than a conventional light source.

At the front surface side of the substrate 122, the reflection sheet 126 maybe located. The reflection sheet 126 maybe located on an area, except for an area in which the light assembly 124 of the substrate 122 is formed. That is, in the reflection sheet 126, a plurality of through-holes 235 may be formed.

The reflection sheet 126 may reflect light emitted from the light assembly 124 to the front surface side. Further, the reflection sheet 126 may again reflect light reflected from the diffusion plate 129.

The reflection sheet 126 may include at least one of a metal and metal oxide, which is a reflection material. For example, the reflection sheet 126 may include a metal and/or metal oxide having high reflectivity, such as at least one of aluminum (Al), silver (Ag), gold (Au), and titanium dioxide (TiO2).

The reflection sheet 126 maybe formed by depositing and/or coating a metal or metal oxide on the substrate 122. In the reflection sheet 126, ink including a metal material may be printed. In the reflection sheet 126, a deposition layer may be formed using a vacuum deposition method such as a heat deposition method, an evaporation method, or a sputtering method. In the reflection sheet 126, a coating layer and/or a print layer may be formed using a printing method, a gravure coating method, or a silk screen method.

An air gap may be formed between the reflection sheet 126 and the diffusion plate 129. The air gap may perform a buffer function of widely spreading light emitted from the light assembly 124. In order to maintain the air gap, a support 200 may be located between the reflection sheet 126 and the diffusion plate 129.

A resin may be deposited on the light assembly 124 and/or the reflection sheet 126. The resin may perform a function of diffusing light emitted from the light assembly 124.

The diffusion plate 129 may diffuse light emitted from the light assembly 124 upward.

The optical sheet 125 may be located at the front surface side of the diffusion plate 129. A rear surface of the optical sheet 125 may close contact with the diffusion plate 129, and a front surface of the optical sheet 125 may close contact with a rear surface of the display panel 110.

The optical sheet 125 may include at least one sheet. Specifically, the optical sheet 125 may include at least one prism sheet and/or at least one diffusion sheet. A plurality of sheets included in the optical sheet 125 may be in a bonding state and/or a close contact state.

The optical sheet 125 may be formed with a plurality of sheets having different functions. For example, the optical sheet 125 may include first to three optical sheets 125*a* to 125*c*. The first optical sheet 125*a* may have a function of a diffusion sheet, and the second and third optical sheets 125*b* and 125*c* may have a function of a prism sheet. The number and/or a location of diffusion sheets and prism sheets maybe changed. For example, the optical sheet 125 may include the first optical sheet 125*a*, which is a diffusion sheet and the second optical sheet 125*b*, which is a prism sheet.

The diffusion sheet prevents light emitted from the diffusion plate 129 from partially concentrating, thereby enabling more uniform luminance of light. The prism sheet concentrates light emitted from the diffusion sheet to enable vertical incidence of light to the display panel 110.

The coupler 125*d* may be formed in at least one of corners of the optical sheet 125. The coupler 125*d* may be formed in at least one of the first to third optical sheets 125*a* to 125*c*.

The coupler 125*d* may be formed at a corner of the long side of the optical sheet 125. The coupler 125*d* formed at the first long side and the coupler 125*d* formed at the second long side may be asymmetric. For example, a location and/or the number of the coupler 125*d* formed at the first long side and the coupler 125*d* formed at the second long side may be different.

Referring to FIG. 7A, on the frame 130, the substrate 122 formed with a plurality of straps extended in a first direction and separated by a predetermined gap in a second direction orthogonal to the first direction may be provided. One side end of a plurality of substrates 122 may be connected to a wiring electrode 232.

The wiring electrode 232 may be extended in a second direction. The wiring electrode 232 may be connected to one side end of the substrate 122 at a constant gap in a second direction.

At one side end of the wiring electrode 232, a wiring hole 234 may be formed. The wiring hole 234 may be a micro hole that penetrates the frame 130. The wiring electrode 232 may be extended to a rear surface of the frame 130 through the wiring hole 234. The wiring electrode 232 maybe electrically connected to an adaptor (not shown) located at a rear surface of the frame 130 through the wiring hole 234.

On the substrate 122, the light assemblies 124 may be disposed at a predetermined gap in the front direction. A diameter of the light assembly 124 may be larger than a width of a second direction of the substrate 122. Accordingly, an external area of the light assembly 124 may extended to an area in which the substrate 122 is not provided.

Referring to FIG. 7B, the substrate 122 formed with a plurality of straps may be extended in other directions other than a first direction at both end portions. That is, both end portions of the substrate 122 may be extended to a corner area such that the light assemblies 124 are located at a corner area.

The substrate 122 that mounts the light assemblies 124 is located at a corner area, thereby compensating a dark portion of the corner area. That is, in an entire area of the display device, light may be uniformly emitted.

One side end of the substrate 122 located at a corner area may be connected to the wiring electrode 232. The wiring electrode 232 may be extended in a second direction and may be electrically connected to an adaptor located at a rear surface of the frame 130 through the wiring hole 234 formed at one side end.

Figure 8:
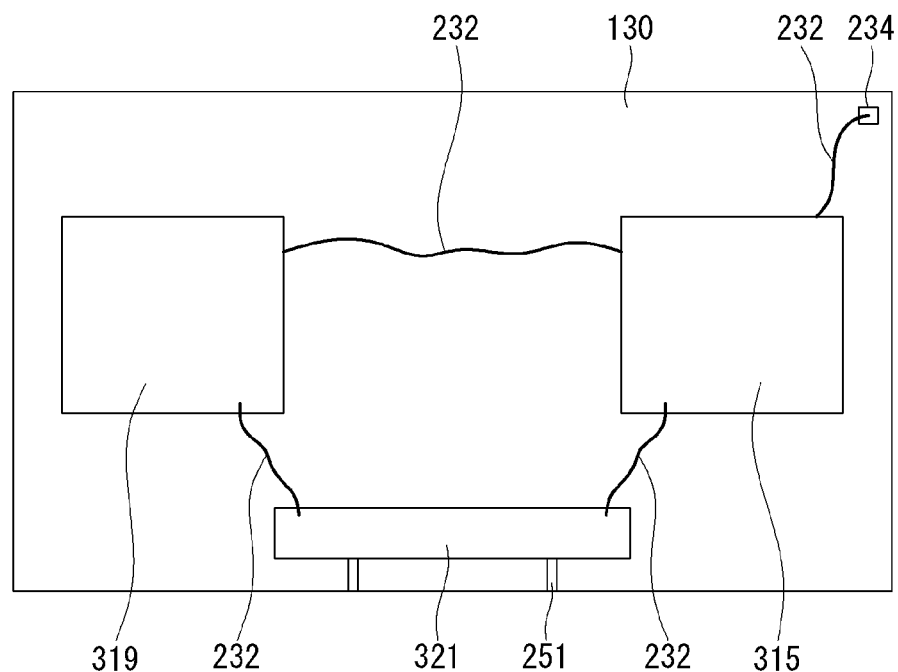

Referring to FIG. 8, the wiring electrode 232 extended at a front surface of the frame 130 through the wiring hole 234 may be connected to one side of a power supply 315. The power supply 315 may be a printed circuit board that supplies power to the display device 100. The power supply 315 may change an AC frequency to a DC frequency. That is, the power supply 315 changes a low frequency to a high frequency, thereby enhancing electricity efficiency.

The power supply 315 may enable the light assembly 124 located at a front surface of the frame 130 to emit light through the wiring electrode 232.

The power supply 315 may be connected to a main board 321 through the wiring electrode 232 at the other side. The main board 321 may be separated by a predetermined gap from the power supply 315. For example, the main board 321 may be located opposite to the power supply 315 in a second direction based on a central portion of the frame 130.

The main board 321 may be a printed circuit board that provides an interface that enables the display device 100 to operate. Further, the main board 321 may check and manage an operation state of each component of the display device 100.

The main board 321 and the power supply 315 maybe connected to a T-CON board 319 through the wiring electrode 232. The T-CON board 319 may be a printed circuit board that transfers a signal input to the main board 321 or the power supply 315 to the display panel 110. The T-CON board 319 may be electrically connected to the display panel 110 of a front surface of the frame 130 through a Flat Flex Cable (FFC cable) 251.

Respective printed circuit boards are connected, but the present invention is not limited thereto and only at least a portion of the respective printed circuit boards may be connected.

Figure 9:
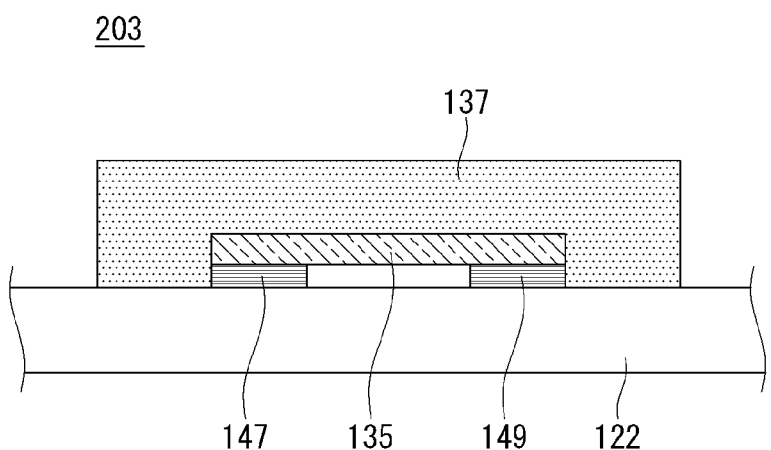
FIGS. 9 and 10 are diagrams illustrating a light source according to an exemplary embodiment of the present invention.
Figure 10:
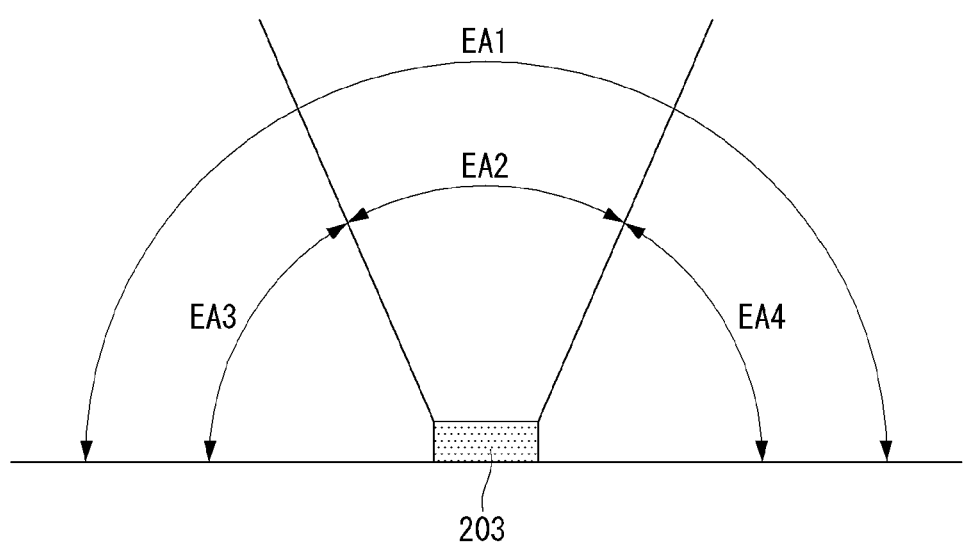

FIGS. 9 and 10 are diagrams illustrating a light source according to an exemplary embodiment of the present invention.

As shown in FIG. 9, a light source 203 may be a COB type light source. The COB type light source 203 may include at least one of a light emitting layer 135, first and second electrodes 147 and 149, and a fluorescent layer 137.

The light emitting layer 135 may be located on the substrate 122. The light emitting layer 135 may emit light of any one color of blue, red, and green. The light emitting layer 135 may include any one of Firpic, (CF3ppy)2Ir(pic), 9, 10-di (2-naphthyl) anthracene (AND), Perylene, distyrybiphenyl, PVK, OXD-7, and UGH-3 (Blue) and a combination thereof.

The first and second electrodes 147 and 149 may be located at both sides of a low surface of the light emitting layer 135. The first and second electrodes 147 and 149 may transfer an external driving signal to the light emitting layer 135.

The fluorescent layer 137 may cover the light emitting layer 135 and the first and second electrodes 147 and 149. The fluorescent layer 137 may include a fluorescent material that converts light of spectrum generated in the light emitting layer 135 to white light. In a lower portion of the fluorescent layer 137, the light emitting layer 135 may have a uniform thickness. The fluorescent layer 137 may have a refractive index of 1.4 to 2.0.

The COB type light source 203 according to an exemplary embodiment of the present invention may be directly mounted on the substrate 122. Therefore, a size of the light assembly 124 may reduce.

As the light source 203 is located on the substrate 122, a heat releasing property is excellent and thus the light source 203 may be driven with a high current. Accordingly, the number of the light sources 203 necessary for securing the same light quantity may be reduced.

As the light source 203 is mounted on the substrate 122, a wire bonding process may be not required. Accordingly, a cost can be reduced with simplification of a process.

As shown in FIG. 10, light emission of the light source 203 according to an exemplary embodiment of the present invention may be performed over a first light emitting range EA1. That is, light emission may be performed over an area including a second light emitting range EA2, which is the front surface side and third and fourth light emitting ranges EA3 and EA4, which are the side surface side. This is different in that a conventional light source including a POB type light source emits light in the second light emitting range EA2. That is, it means that the light source 203 according to an exemplary embodiment of the present invention may emit light to a wide range including a side surface of the light source 203.

FIGS. 11 to 22 are diagrams illustrating a light assembly of a display device according to an exemplary embodiment of the present invention.

Figure 11:
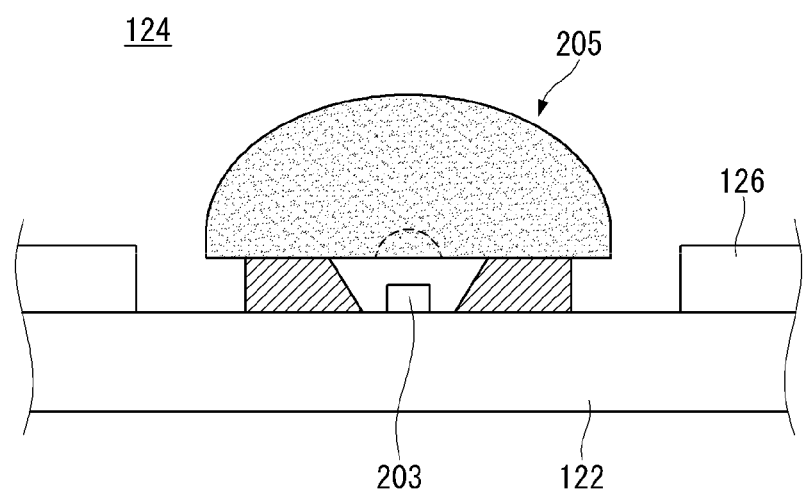
FIGS. 11 to 22 are diagrams illustrating a light assembly of a display device according to an exemplary embodiment of the present invention.

Referring to FIG. 11, the light assembly 124 may include a light source 203 and a lens 205.

The light source 203 may be located at a central portion of the light assembly 124. The light source 203 is not limited thereto and may be located at a portion other than a central portion of the light assembly 124.

The light source 203 may emit light by an electric signal. For example, the light source 203 may emit light in a third direction by an electric signal. A direction of the light source 203 is not limited thereto and the light source 203 may emit light in a direction inclined by a predetermined angle from a third direction by an electric signal.

The lens 205 may be located at an upper portion of the light source 203. The lens 205 may have a diameter larger than that of the light source 203. In order words, the lens 205 may have a shape that encloses the light source 203. The lens 205 may change an advancing direction of light emitted from the light source 203 to send light to the display panel. A detailed structure of the lens 205 will be described later.

The lens 205 may be enclosed by the reflection sheet 126. A diameter of an area in which the reflection sheet 126 is not provided on the substrate 122 may be larger than that of the lens 205.

The lens 205 may include a material having a refractive index of 1 to 1.5. For example, the lens 205 may include any one of Poly Methyl Mata Acrylate (PMMA), Cylic Olefin Copolymer (COC), and a combination thereof.

In the light assembly 124 according to the present exemplary embodiment, the light source 203 may be directly located on a printed circuit board 122. Accordingly, the light assembly 124 can have a small size and a light weight.

Figure 12:
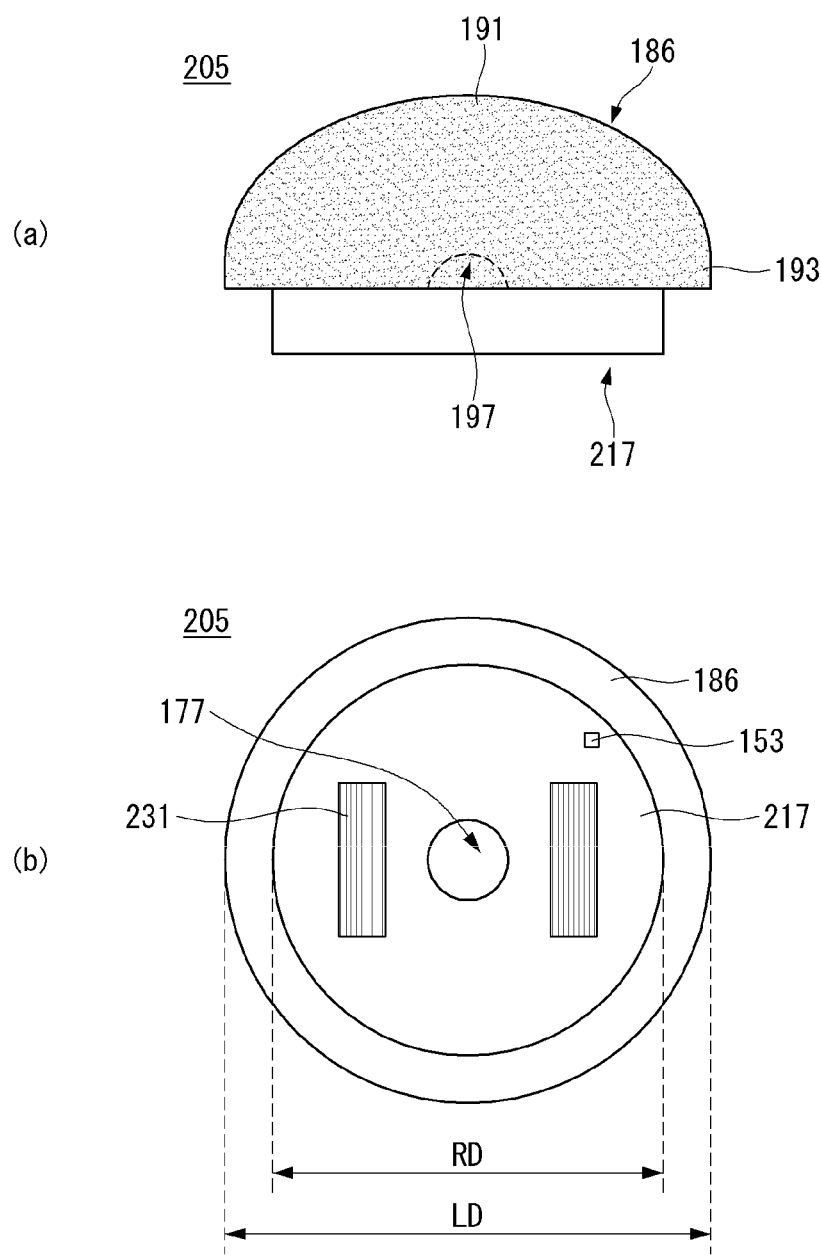

Referring to FIG. 12, the lens 205 may include a refraction portion 186 and a reflection portion 217. The refraction portion 186 may change an advancing direction of light emitted from a light source to send light to the display panel. The refraction portion 186 may include a convex portion 191 and a side portion 193.

The convex portion 191 may have a hemisphere shape protruded upward. The convex portion 191 may have a convex shape upward. That is, the convex portion 191 may have a diameter reducing as advancing upward. An advancing direction of light may be widely spread while passing through the convex portion 191. Accordingly, light may be uniformly emitted to the display panel while passing through the convex portion 191.

The side portion 193 may be extended in a lower portion of the convex portion 191. The side portion 193 may have the same diameter in an entire portion. That is, the side portion 193 may have a cylindrical shape. Accordingly, it may more conveniently attach the reflection portion 217 to be described later to a lower portion of the side portion 193.

In a central portion of a low surface of the side portion 193, a hemispherical groove 197 may be located. The hemispherical groove 197 may have a shape advancing upward from a central portion of a low surface. The hemispherical groove 197 may have a hemisphere shape that encloses a light source. The hemispherical groove 197 may transfer light applied from the light source to a side surface or an upper surface of the lens 205.

The reflection portion 217 may be extended from a low surface of the side portion 193. The reflection portion 217 and the refraction portion 186 may be integrally formed. A coupling method of the reflection portion 217 and the refraction portion 186 will be described later.

The reflection portion 217 may have a cylindrical shape extended in the same direction as that of the side portion 193. A diameter RD of the reflection portion 217 may be smaller than a diameter LD of the side portion 193 of the refraction portion 186. Accordingly, when a user views the lens 205 attached to the substrate, the reflection portion 217 may not be viewed. Accordingly, the user may feel that the lens 205 has an enhanced external appearance.

The reflection portion 217 may reflect light emitted from the light source to send the reflected light to the refraction portion 186. Accordingly, the reflection portion 217 may include a material having high reflectivity. In order to improve reflectivity, the reflection portion 217 may have a white surface.

The reflection portion 217 may include a central hole 177, a pad 231, and an electrostatic portion 153. The central hole 177 may have a shape that penetrates a central portion of the reflection portion 217. Accordingly, due to the central hole 177, a low surface of the refraction portion 186 may be exposed.

The central hole 177 may be a portion that inserts a light source. Accordingly, a diameter of the central hole 177 may be larger than a width of the light source. A size and location relationship of the central hole 177 will be described later.

The central hole 177 may be a passage that discharges a heat generated in the light source to the outside. When a heat is not discharged by the central hole 177, a temperature of the light source excessively rises and thus the light source may be deteriorated, light emitting efficiency may be deteriorated, and a life-span of the light source may be reduced.

At an outer edge of the central hole 177, the pad 231 may be located. For example, at both sides of the central hole 177, the pads 231 may be located. The pad 231 may have a shape in which a metal is inserted at a low surface of the reflection portion 217. That is, the pad 231 may have a shape depressed into the reflection portion 217, and in a depressed portion, a metal may be inserted. In order to use a Surface Mount Technology (SMT) process to be described later, the metal inserted into the pad 231 may include a material having a high melting point. For example, a melting point of the pad 231 may be higher than that of solder cream necessary for a SMT process. The pad 231 may be formed through an insert injection process of the metal.

At one side of a low surface of the reflection portion 217, the electrostatic portion 153 may be located. For example, the electrostatic portion 153 may be located at the external diameter side of the reflection portion 217. The electrostatic portion 153 may be a portion that inserts a zener diode. That is, the electrostatic portion 153 is depressed into the reflection portion 217, and in a depressed portion, the zener diode may be inserted. Accordingly, the electrostatic portion 153 can prevent static electricity from occurring in the light source. That is, the electrostatic portion 153 can prevent Electrostatic Discharge (ESD). As the zener diode is inserted into the reflection portion 217, each lens 205 may include the zener diode. Accordingly, ESD can be more effectively prevented.

Figure 13:
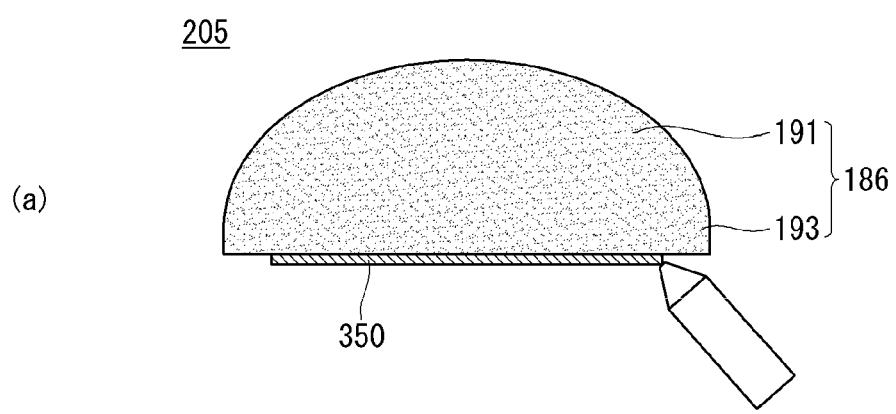
Figure 13:
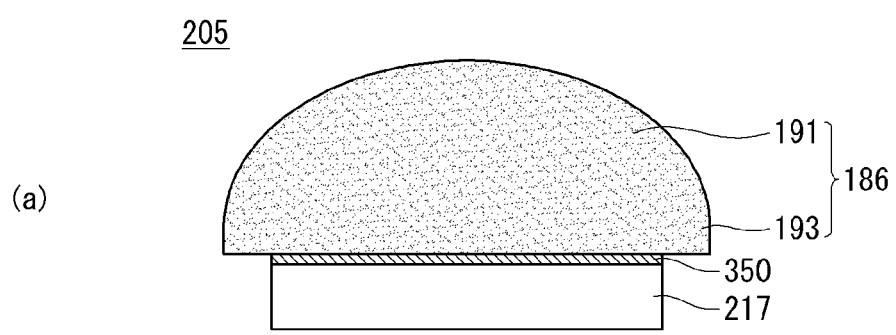

Referring to FIG. 13, by forming an adhesive layer 350 at a low surface of the side portion 193, the refraction portion 186 and the reflection portion 217 may be coupled. The adhesive layer 350 may be formed in a portion corresponding to a coupling location of the reflection portion 217.

The adhesive layer 350 may have a separate thickness. Accordingly, a foreign substance or dust may enter between the refraction portion 186 and the reflection portion 217. In order to prevent this, the adhesive layer 350 may be protruded further than an outer circumference portion of the reflection portion 217.

In a display device according to an exemplary embodiment of the present invention, the refraction portion 186 and the reflection portion 217 of the lens 205 may be attached by an adhesive to be integrally formed. Accordingly, luminous efficiency when the refraction portion 186 and the reflection portion 217 are integrally formed may be better than that when the refraction portion 186 and the reflection portion 217 are separately formed.

Figure 14:
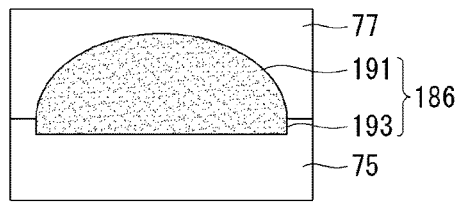
Figure 14:
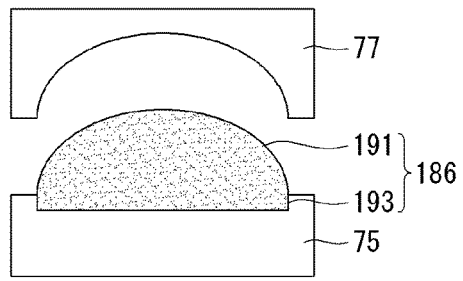
Figure 14:
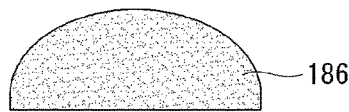
Figure 14:
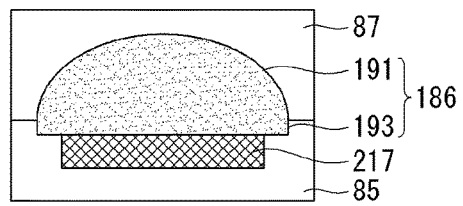
Figure 14:
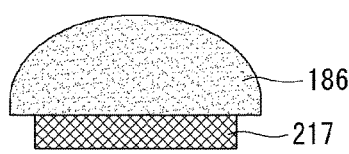

Referring to FIG. 14, the lens 205 may be formed by double injection. As shown in FIG. 14A, by inserting a raw material of the refraction portion 186 between a first upper mold 77 and a first lower mold 75, the refraction portion 186 may be injection molded. In the first upper mold 77, a shape of the convex portion 191 may be provided, and in the first lower mold 75, a shape of the side portion 193 may be provided.

Thereafter, as shown in FIGS. 14B and 14C, by separating the first upper mold 77 from the first lower mold 75, the refraction portion 186 may be formed.

Thereafter, as shown in FIG. 14D, by inserting the formed refraction portion 186 into a second upper mold 87 and a second lower mold 85, the reflection portion 217 maybe injection molded. In this case, in the second lower mold 85, in addition to a shape of the side portion 193, a shape of the reflection portion 217 having a diameter smaller than that of the side portion 193 may be provided. Accordingly, at a low surface of the side portion 193, the reflection portion 217 may be formed by an injection process.

In a display device according to an exemplary embodiment of the present invention, the refraction portion 186 and the reflection portion 217 of the lens 205 are integrally formed, thereby having good luminous efficiency. Further, as the lens 205 is formed by a double injection process, a separate thickness may not exist due to an adhesive layer between the refraction portion 186 and the reflection portion 217. Accordingly, light that gets out to the adhesive layer reduces and thus light emitting efficiency can be further improved.

Figure 15:
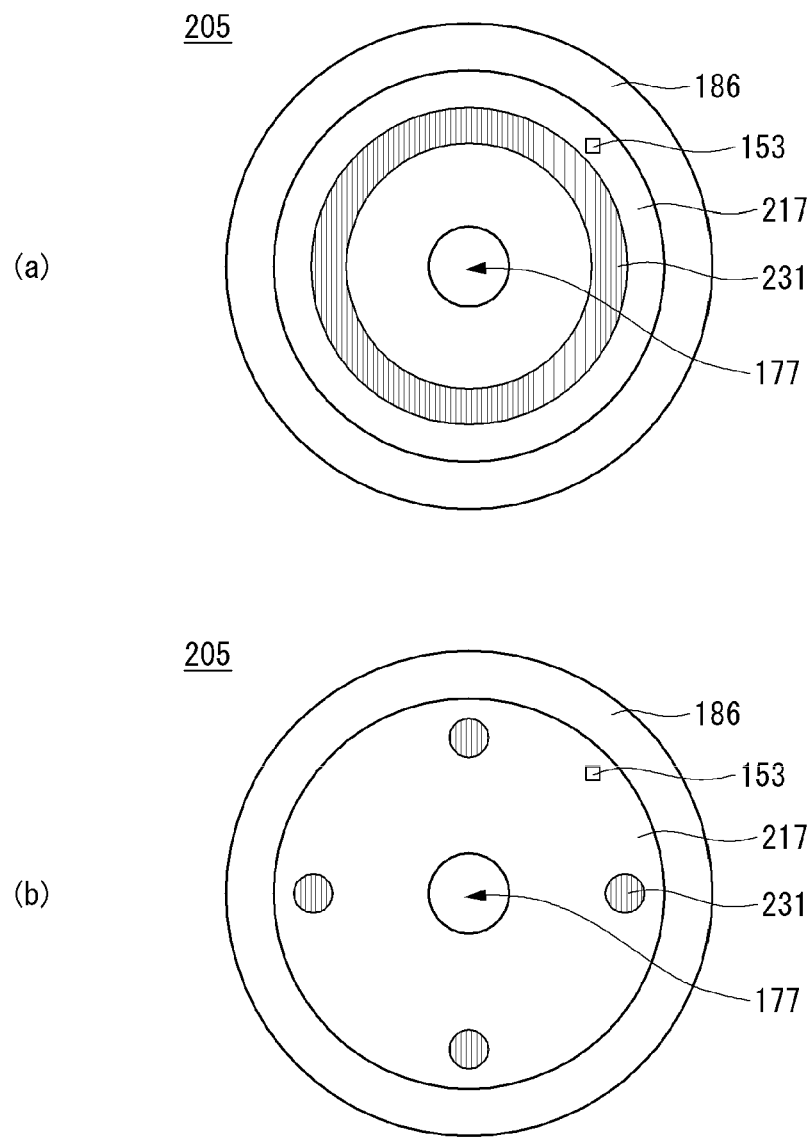

Referring to FIG. 15, the pad 231 maybe provided in various shapes at a low surface of the reflection portion 217.

For example, as shown in FIG. 15A, the pad 231 may have a circular shape whose central portion is hollow. That is, the pad 231 may have a ring shape that encloses a central hole 177. In this case, because the pad 231 is located in an entire diameter direction of a low surface of the reflection portion 217, the lens 205 and the substrate may be more strongly coupled.

For another example, as shown in FIG. 15B, the pads 231 may be located at both ends of first and second directions of the reflection portion 217. In this case, the respective pads 231 may couple the lens 205 and the substrate at different locations. Further, a location of the pads 231 maybe distributed. Accordingly, even if one pad 231 is separated, coupling of the lens 205 and the substrate may be maintained.

In the display device according to an exemplary embodiment of the present invention, due to a location change of the pad 231, a coupling force of the lens 205 and the substrate can be improved.

Figure 16:
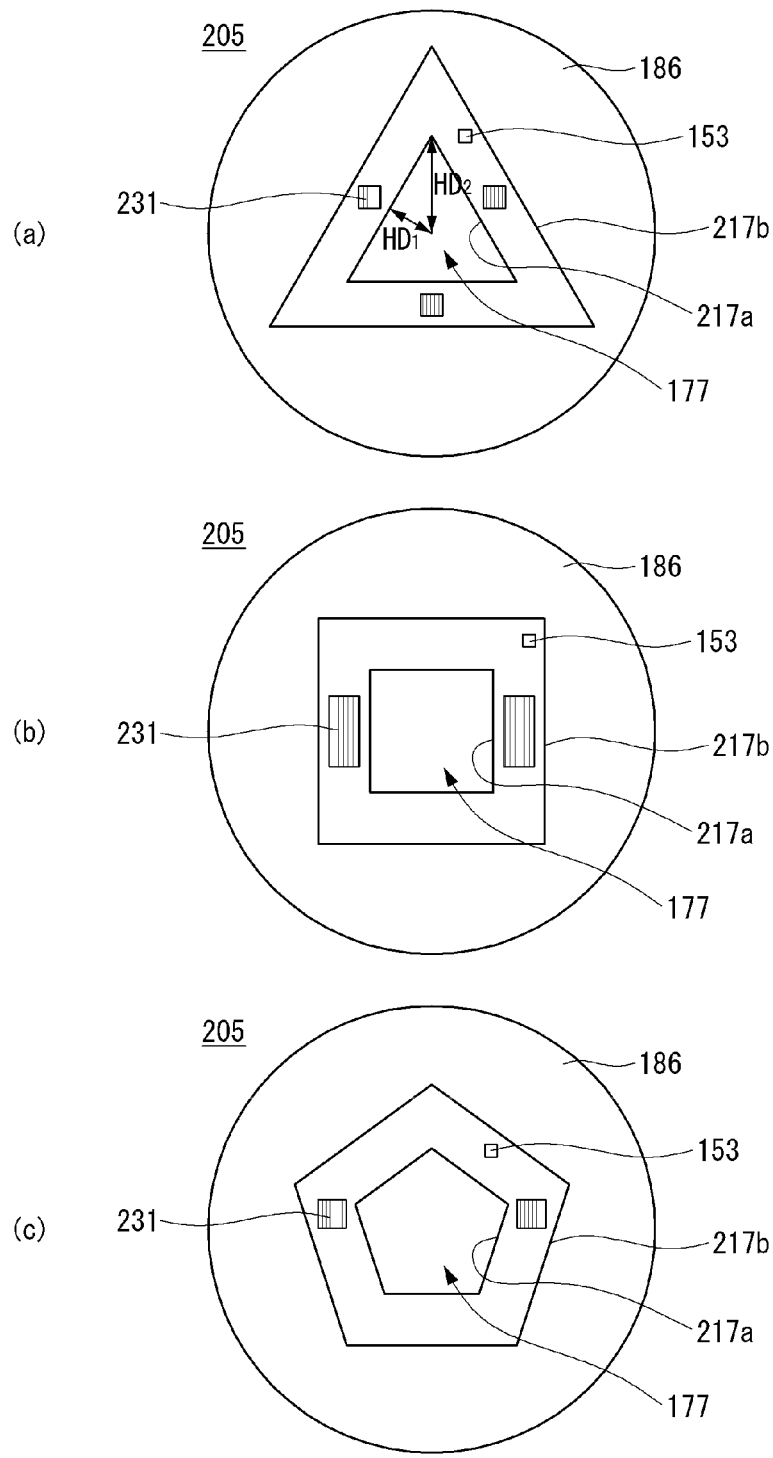

Referring to FIG. 16, the reflection portion 217 may have various shapes. For example, a low surface of the reflection portion 217 may have any one shape of a triangle, quadrangle, and pentagon whose central portion is hollow.

Both an inner portion 217a and an outer portion 217b of the reflection portion 217 may have any one shape of a triangle, a quadrangle, and a pentagon. Unlike a case in which a low surface of the reflection portion 217 is a circle, a distance from the center of the reflection portion 217 to the inner portion 217a of the reflection portion 217 may be different. For example, as shown in FIG. 16A, a distance HD1 from the center of the reflection portion 217 to one side of the inner portion 217a of the reflection portion 217 may be shorter than a distance HD2 from the center of the reflection portion 217 to an apex of the inner portion 217a of the reflection portion 217. In this case, as a distance HD1 from the center of the reflection portion 217 to the inner portion 217a of the reflection portion 217 becomes short, light may be further concentrated.

Accordingly, by changing a shape of the reflection portion 217, in a portion in which a bright point defect occurs, a user may increase a distance from the center of the reflection portion 217 to the inner portion 217a of the reflection portion 217. Accordingly, light may be uniformly distributed to the display panel.

Figure 17:
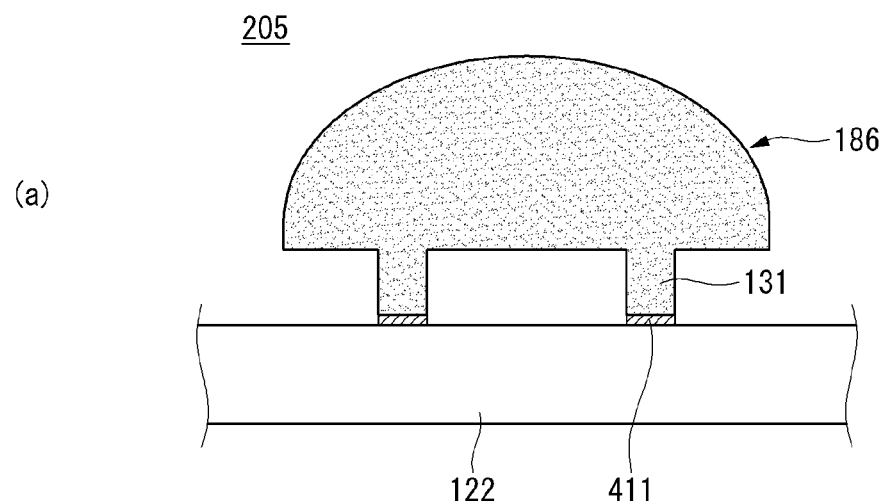
Figure 17:
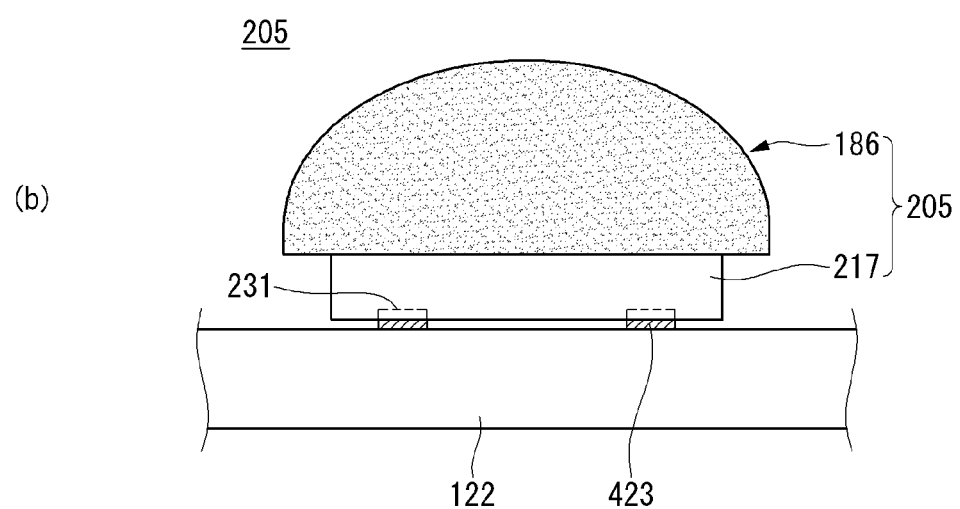

Referring to FIG. 17, as shown in FIG. 17A, in a display device of the conventional art, the lens 205 may be formed with only the refraction portion 186. Specifically, in the lens 205, a support 131 protruded from a low surface of the refraction portion 186 to the outside may be coupled to the substrate 122. In this case, the support 131 and the substrate 122 are coupled using epoxy 411. When coupling using the epoxy 411, a process time may be extended to a long period. Further, because the lens 205 and the substrate 122 are coupled in a short area, there is a problem of a high probability in which the lens 205 may be separated from the substrate 122.

Alternatively, as shown in FIG. 17B, in the display device according to an exemplary embodiment of the present invention, the substrate 122 and a metal inserted into the pad 231 may be coupled by an SMT process. That is, a metal inserted into the pad 231 may be coupled to the substrate 122 using solder cream 423. After the solder cream 423 is injected between the metal inserted into the pad 231 and the substrate 122, by heating the solder cream 423, the metal inserted into the pad 231 and the substrate 122 may be coupled.

In the display device according to an exemplary embodiment of the present invention, the lens 205 and the substrate 122 may be coupled using an SMT process. Accordingly, a process time can be reduced, and a coupling force of the lens 205 and the substrate 122 can be strong.

Figure 18:
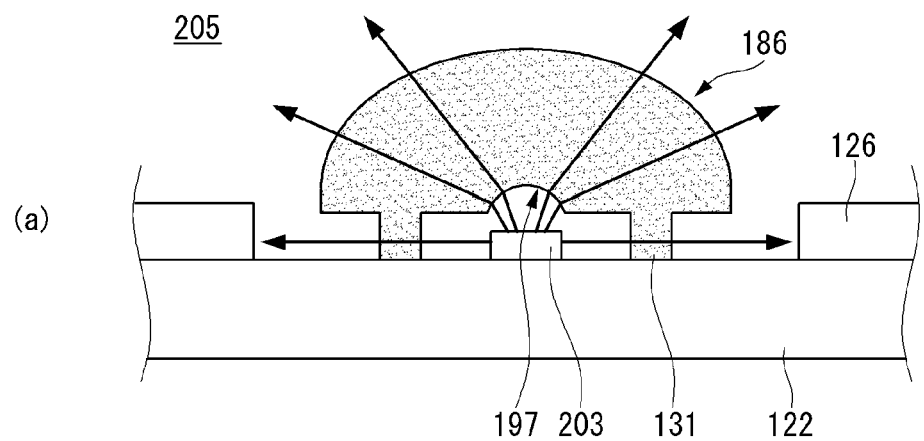
Figure 18:
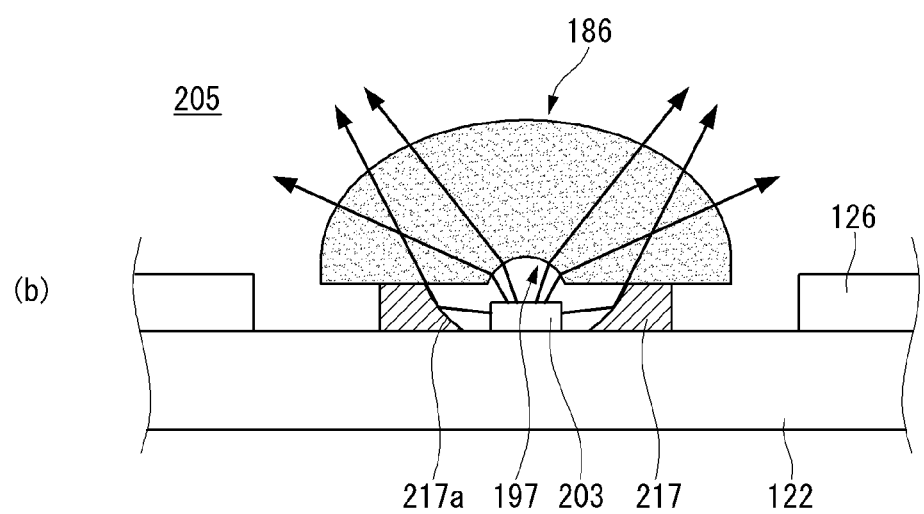

Referring to FIG. 18, as shown in FIG. 18A, in a display device at the convention art, at least a portion of light emitted from the light source 203 may pass through without the refraction portion 186. For example, light emitted from a side surface of the light source 203 may pass through without the refraction portion 186. The passed light may be absorbed into the substrate 122 or the reflection sheet 126. Accordingly, a light quantity arriving toward the display panel may be reduced. That is, light efficiency of a backlight unit may be reduced.

Alternatively, as shown in FIG. 18B, in the display device according to an exemplary embodiment of the present invention, the reflection portion 217 may be located separately from a side surface of the light source 203, and the refraction portion 186 may be located separately from an upper surface. Accordingly, light emitted to a side surface of the light source 203 is reflected by the reflection portion 217 to advance toward an upper portion of the refraction portion 186. Accordingly, light of a quantity larger than that of the convention art may advance toward an upper portion of the refraction portion 186. That is, light efficiency of the backlight unit can be improved.

Figure 19:
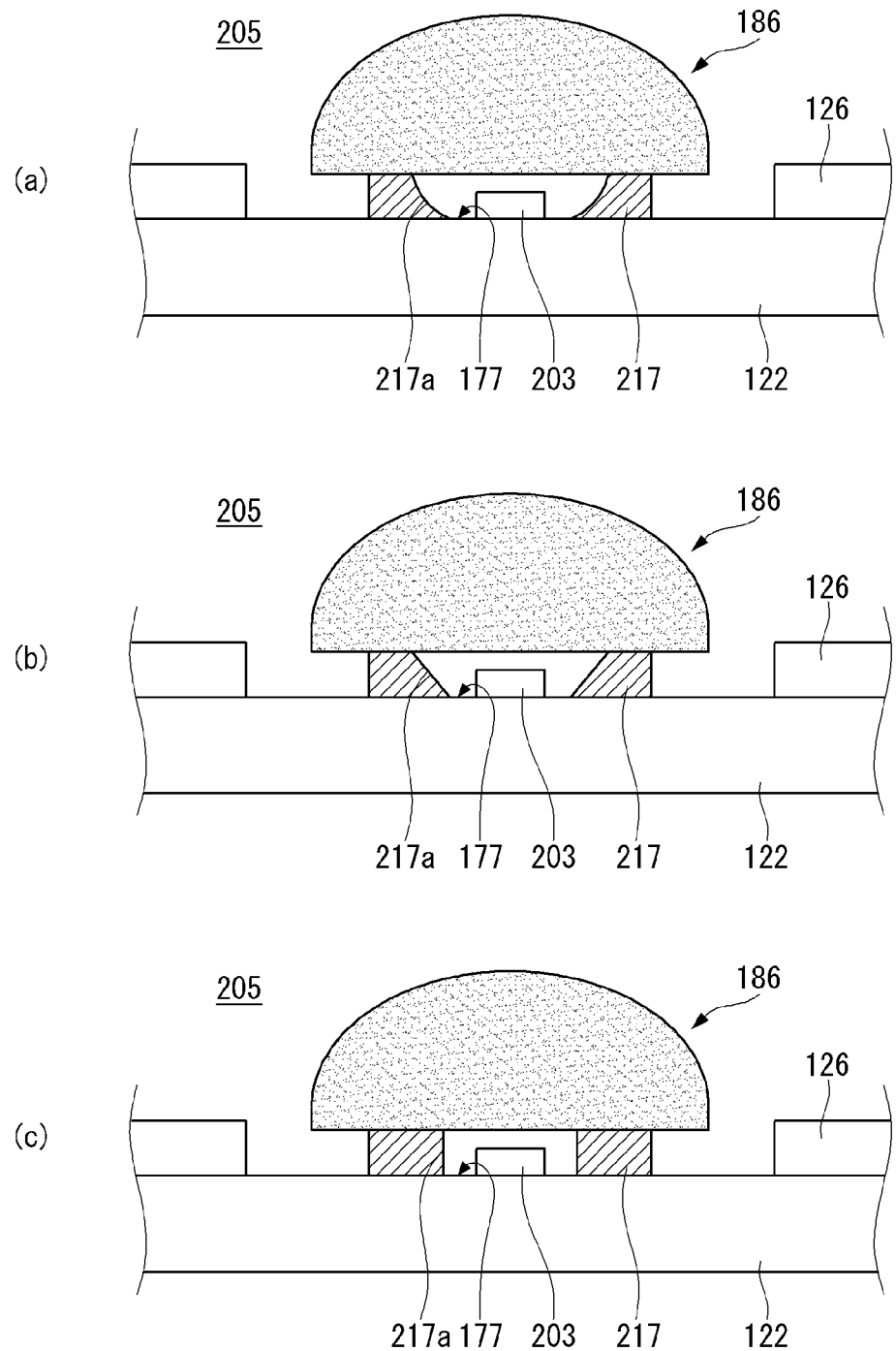

Referring to FIG. 19, in the display device according to an exemplary embodiment of the present invention, the inner portion 217a of the reflection portion 217 may have various shapes.

For example, as shown in FIG. 19A, the inner portion 217a of the reflection portion 217 may be concavely inclined. That is, an angle of the inner portion 217a of the reflection portion 217 from the ground may gradually increase from 0° of a lower surface to 90° of an upper surface. In this case, when an angle of the inner portion 217a of the reflection portion 217 from the ground gradually increases from 0° of a lower surface to 90° of an upper surface, light advancing toward an upper surface may increase greater than that when an angle of the inner portion 217a of the reflection portion 217 from the ground is constant. Accordingly, light efficiency of the display device can be further improved.

For another example, as shown in FIG. 19B, the inner portion 217a of the reflection portion 217 may be inclined by a constant angle from the ground. In this case, light emitted to a lower portion of a side surface of the light source 203 may be reflected to a central portion of the lens 205 further than light emitted to an upper portion of a side surface of the light source 203. Light emitted from a side surface of the light source 203 may have a light quantity larger than that of light applied from a side surface of a lower portion as advancing upward. Accordingly, a light quantity of a central portion further increases and thus light efficiency can be enhanced.

For another example, as shown in FIG. 19C, the inner portion 217a of the reflection portion 217 may be orthogonal to the ground. In this case, a central hole 177 may have a circular shape. Accordingly, the reflection portion 217 may be more easily produced.

Figure 20:
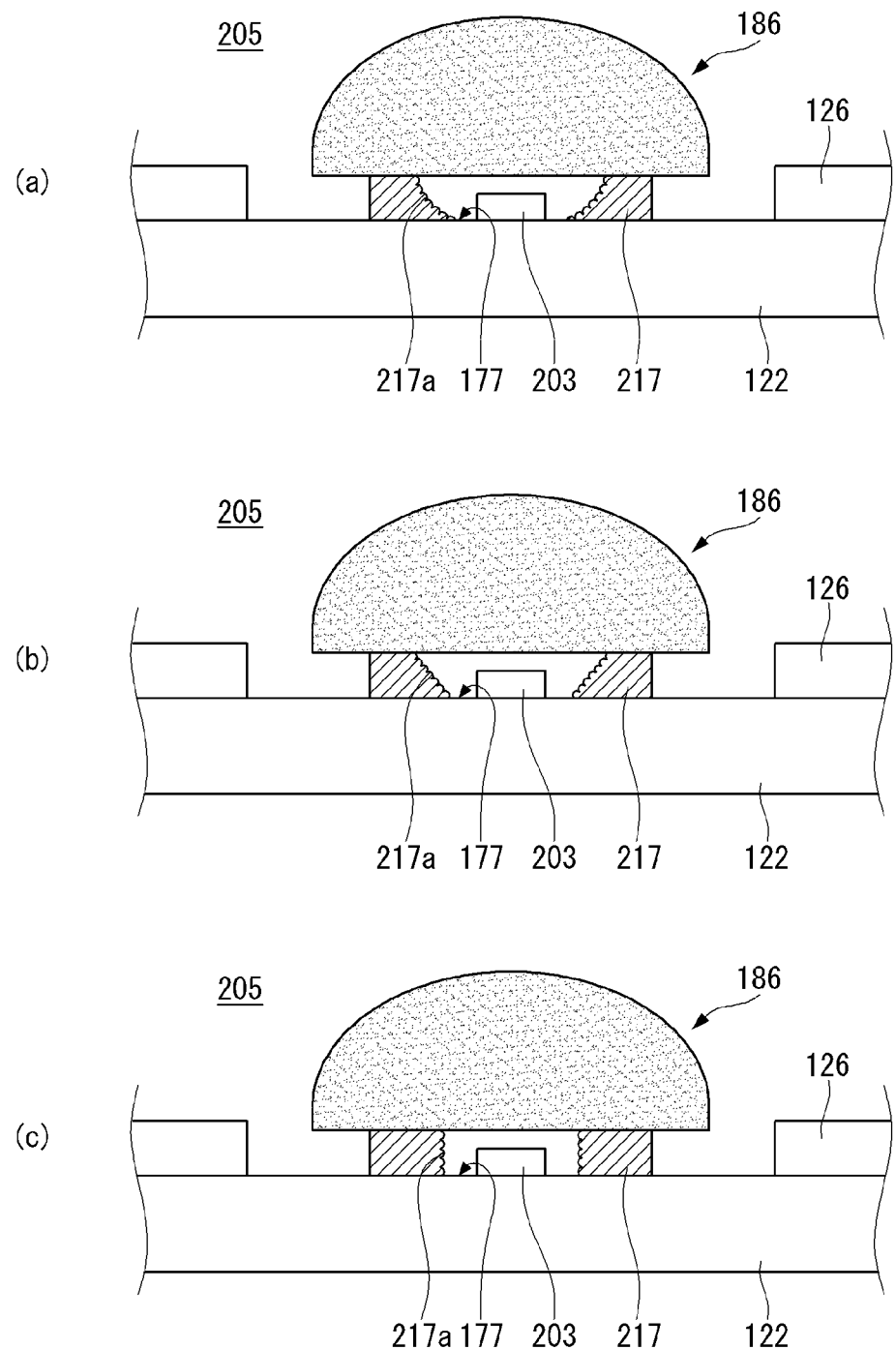

Referring to FIG. 20, in the display device according to an exemplary embodiment of the present invention, at the inner portion 217a of the reflection portion 217, a plurality of protrusions may be located. The protrusions may be convexly protruded toward the central hole 177.

In the display device according to an exemplary embodiment of the present invention, due to protrusions, light emitted to a side surface of the light source 203 may be irregularly distributed in several directions. Accordingly, because of less light that gets out to the side, while light efficiency is improved, light can be uniformly distributed.

In the present exemplary embodiment, it is shown that protrusions are convexly protruded to the inner portion 217a of the reflection portion 217, but the present invention is not limited thereto and the protrusions may be concavely protruded to the inner portion 217a of the reflection portion 217.

Figure 21:
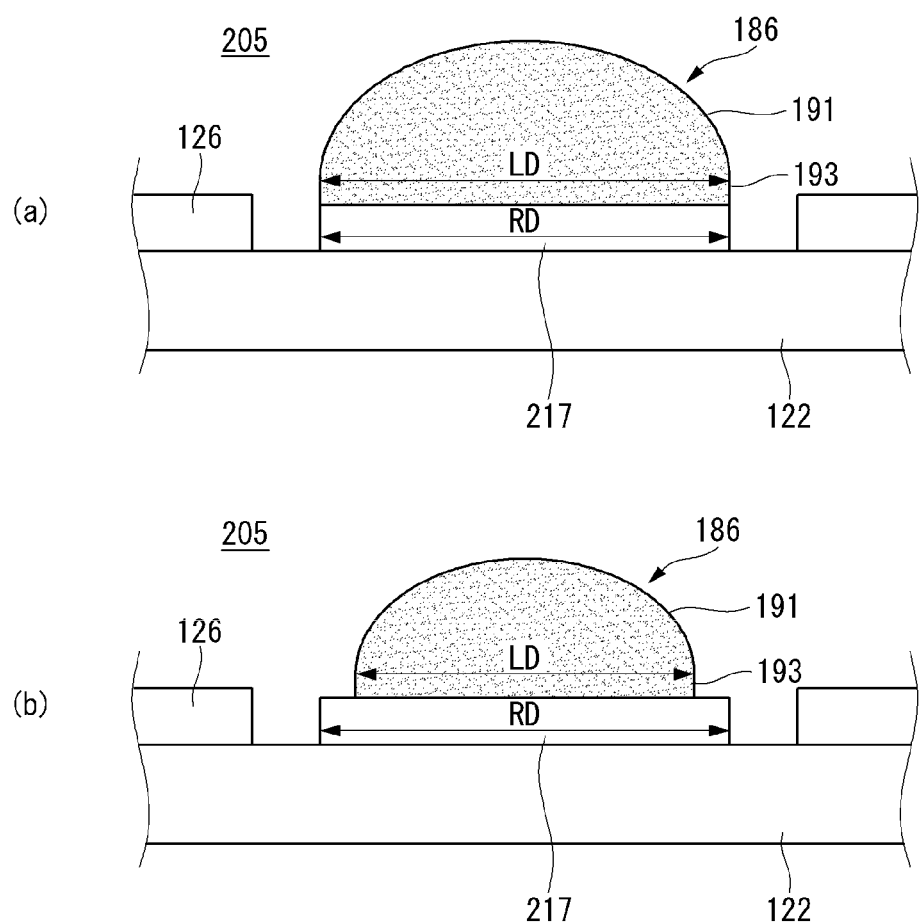

Referring to FIG. 21, in the display device according to an exemplary embodiment of the present invention, a relationship between a diameter RD of the reflection portion 217 and a diameter LD of the side portion 193 of the refraction portion 186 may variously change.

For example, as shown in FIG. 21A, the diameter RD of the reflection portion 217 may be the same as the diameter LD of the side portion 193. In this case, when a user views the lens 205 attached to the substrate 122, the reflection portion 217 may not be viewed. Further, because the outside of the reflection portion 217 is extended in a straight line to the side portion 193, upon double injection, a mold shape can be simplified. Accordingly, a production process can be more simplified.

For another example, as shown in FIG. 21B, the diameter RD of the reflection portion 217 may be larger than the diameter LD of the side portion 193. In this case, a contact area of the lens 205 and the substrate 122 may further increase. Accordingly, the lens 205 and the substrate 122 may be more stably coupled. Further, as the diameter RD of the reflection portion 217 increases, a diameter of the central hole to be described later may be more freely changed.

Figure 22:
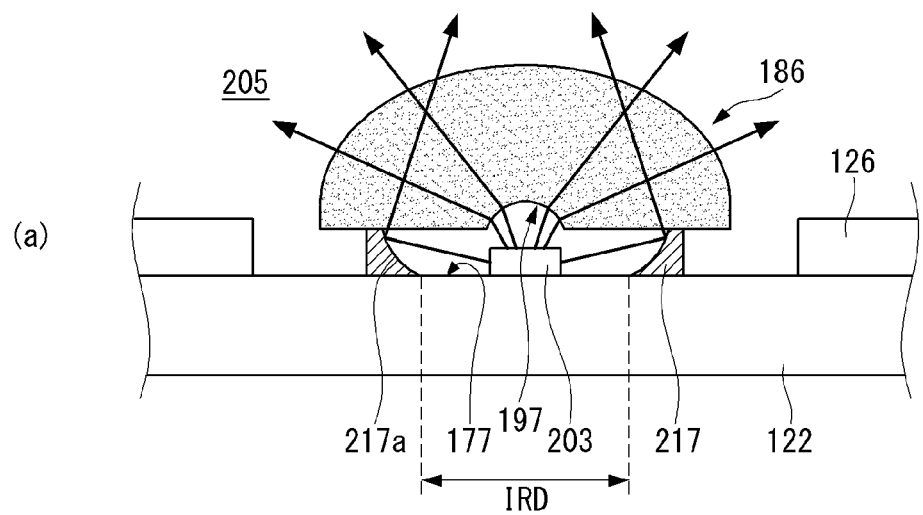
Figure 22:
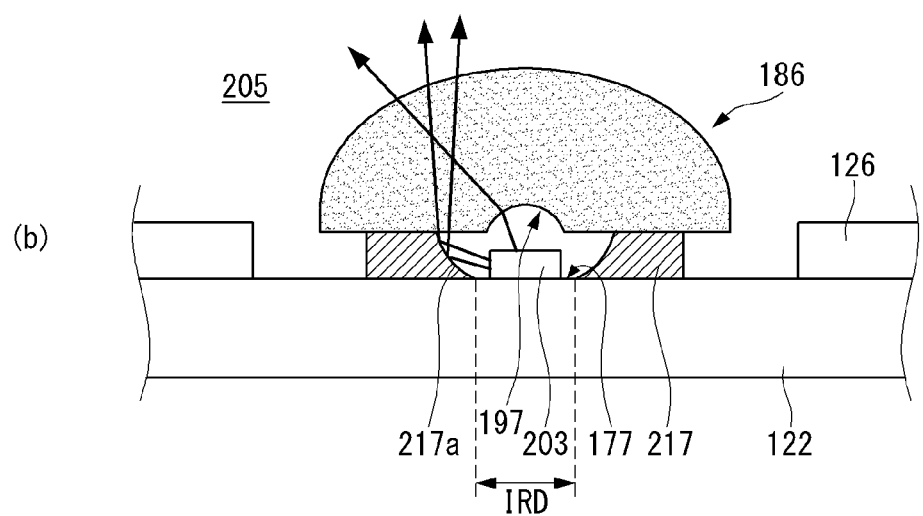

Referring to FIG. 22, in the display device according to an exemplary embodiment of the present invention, a diameter IRD of a low surface of the central hole 177 may be variously changed.

For example, as shown in FIG. 22A, the diameter IRD of a low surface of the central hole 177 may increase much larger than a width of the light source 203. In this case, in the inner portion 217a of the reflection portion 217, only light emitted to a lower end portion of a side surface of the light source 203 may be reflected. Light emitted to an upper portion or an upper end portion of a side surface of the light source 203 may advance to the refraction portion 186. Light directly advancing to the refraction portion 186 may be widely distributed.

For another example, as shown in FIG. 22B, the diameter IRD of a low surface of the central hole 177 may be a little larger than a width of the light source 203. In this case, in the inner portion 217a of the reflection portion 217, light emitted from a lower end portion and an upper end portion of a side surface of the light source 203 maybe reflected. Compared with a case in which the diameter IRD of a low surface of the central hole 177 is much larger than a width of the light source 203, light may be concentrated to an upper portion of the lens 205.

In the display device according to an exemplary embodiment of the present invention, by adjusting the diameter IRD of a low surface of the central hole 177, light efficiency may be adjusted. When increasing light efficiency by increasing the diameter IRD of a low surface of the central hole 177 to be a little larger than a width of the light source 203, even if the number of the lenses 205 located on the substrate 122 is reduced, the same light efficiency can be obtained. Accordingly, a production cost of the display device can be reduced.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit, comprising:
   a substrate; and
   at least one light assembly separately located on the substrate,
   wherein the light assembly comprises:
     a light source; and
     a lens configured to shield an upper surface and a side surface of the light source,
   wherein the lens comprises:
     a refraction portion separately located on the upper surface of the light source; and
     a reflection portion separately located at the side surface of the light source,
   wherein the refraction portion comprises:
     a convex portion having a hemisphere shape protruded upward; and
     a side portion extended from a lower portion of the convex portion, and
   wherein a diameter of the reflection portion is smaller than a diameter of the side portion.

2. The backlight unit of claim 1, wherein the refraction portion and the reflection portion are coupled by an adhesive layer.

3. The backlight unit of claim 1, wherein the refraction portion and the reflection portion are coupled by a double injection process.

4. The backlight unit of claim 1, wherein the side portion has a cylindrical shape.

5. The backlight unit of claim 4, wherein the reflection portion has a cylindrical shape.

6. The backlight unit of claim 5, wherein the side portion includes an annular bottom surface,
   wherein the annular bottom surface faces the substrate, and
   wherein the annular bottom surface surrounds an upper side of the reflection portion.

7. The backlight unit of claim 1, wherein the reflection portion comprises:
   a central hole configured to penetrate a central portion;
   a pad located at an outer edge of the central hole; and
   an electrostatic portion located at an external side diameter of the reflection portion.

8. The backlight unit of claim 7, wherein the pad has a shape depressed into the reflection portion.

9. The backlight unit of claim 8, wherein in the pad, a metal is inserted into a depressed portion, and
   the pad is formed through an insert injection process of the metal.

10. The backlight unit of claim 9, wherein the metal and the substrate are coupled by a Surface Mount Technology (SMT) process.

11. The backlight unit of claim 7, wherein the pads are located at both sides of the central hole.

12. The backlight unit of claim 7, wherein the pad has a ring shape that encloses the central hole.

13. The backlight unit of claim 7, wherein the electrostatic portion has a shape depressed into the reflection portion, and
   a zener diode is inserted into a depressed portion.

14. The backlight unit of claim 7, wherein the reflection portion has a protrusion therein.

15. The backlight unit of claim 7, wherein the reflection portion is inclined inward.

16. A display device, comprising:
   the backlight unit of claim 1;
   a display panel located at a front surface of the backlight unit; and
   a back cover located at a rear surface of the backlight unit.

17. The display device of claim 16, wherein the refraction portion and the reflection portion are coupled by an adhesive layer.

18. The display device of claim 16, wherein the refraction portion and the reflection portion are coupled by a double injection process.

19. The display device of claim 16, wherein the reflection portion is inclined inward.

* * * * *